March 21, 1950 — B. WALKER — 2,500,970
BUMPER FOR ARMORED TRACK-LAYING VEHICLES
Filed Sept. 20, 1945
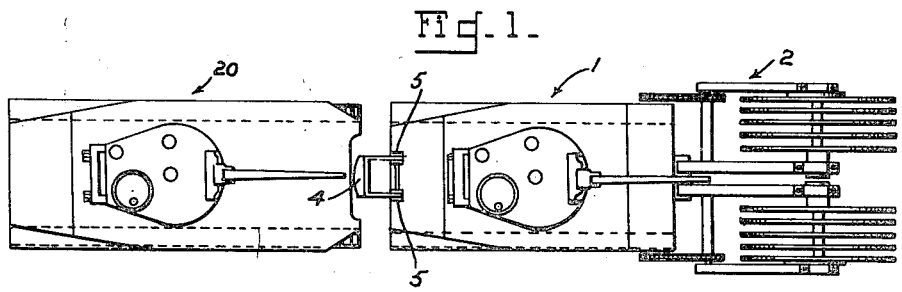
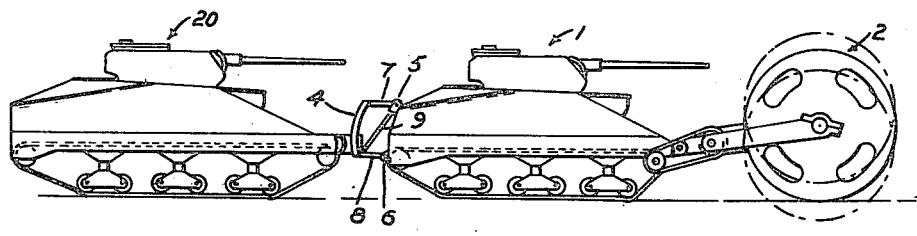
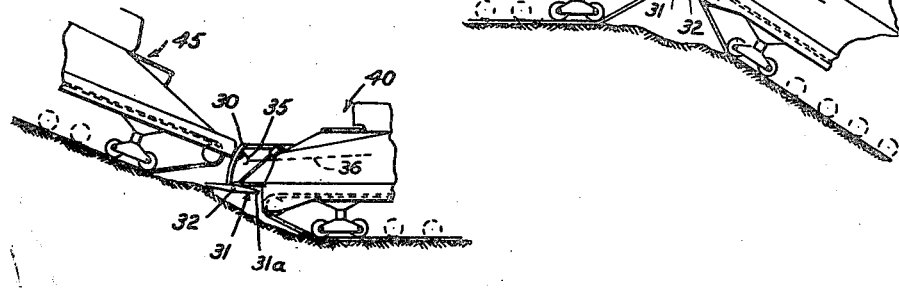
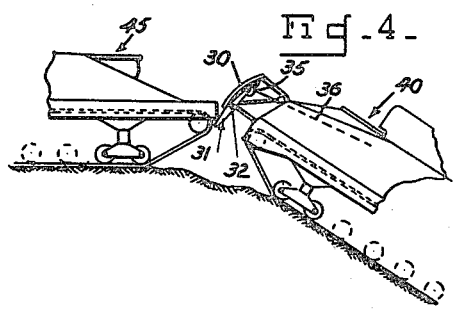
Inventor
Brooks Walker
By J. H. Church & W. E. Thibodeau
Attorney Patented Mar. 21, 1950

2,500,970

UNITED STATES PATENT OFFICE 2,500,970

BUMPER FOR ARMORED TRACK-LAYING VEHICLES

Brooks Walker, Piedmont, Calif.

Application September 20, 1945, Serial No. 617,659

2 Claims. (Cl. 180—9.1)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to improvements in bumpers, and relates particularly to improved bumpers for use on armored vehicles. The invention also relates to the improvement in bumpers whereby the angle relative to the horizontal between the vehicle being pushed and the pushing vehicle can be sustantial without the pushing vehicle going under the bumper of the vehicle being pushed.

Another feature of this invention is to provide a bumper whose lower portion is hinged so as not to drag on the roadway when going forward over obstructions, etc., and still allow that portion of the bumper to take a substantial forward push.

The specific nature of the invention as well as other objects and advantages thereof will clearly appear from a description of a preferred form of embodiment as shown in the accompanying drawing in which:

Figure 1 is a plan view of one form of the invention adapted to the rear of an armored vehicle attached to a disc type mine exploder, with a second vehicle in position to push on said bumper.

Figure 2 is a side view of the structure shown in Figure 1.

Figure 3 is a side view with a portion of the vehicles cut away showing another form of the invention in which the larger portion of the bumper is hinged.

Figure 4 is a view similar to Figure 3 but with the vehicle in a different position so that the pushing vehicle is contacting the lower hinged portion of the bumper at the rear of the forward vehicle.

Referring to the drawings in detail, the vehicle I is attached to a disc type mine exploder 2 which is adapted to discharge mines on the surface or buried in the ground.

A second armored vehicle 20 is shown in the pushing relationship where it can assist vehicle I when the terrain so requires. A bumper 4 is attached to the rear of the vehicle by supporting pins 5 and 6 which engage the supporting arms 7, 8, and 9. The rear face of the bumper is preferably crowned transversely and may be crowned slightly in vertical section, although this is not essential. The bumper is greater in vertical dimension than its width, so that the pushing vehicle will not require a bumper and may push on the armor plate at its forward end, which for ballistic resistance is more than amply strong to stand all of the pushing requirements which may be imposed upon it through the surface of bumper 4. The contact surface of bumper 4 may be covered with some material to assist in shock absorption, such as wood, rubber or even a pneumatic tire type section, however, tests have indicated that steel bumpers against the steel armor of the pushing vehicle is quite satisfactory.

In Figures 3 and 4 an alternate construction is shown wherein the bumper 30 is carried at the rear of armor vehicle 40 and is adapted to engage the frontal armor of the rear armored vehicle 45. In this form of embodiment, a hinged member 31 is pivoted at pin 32 near the lower face of bumper 30 and is so adapted that when contacting the ground as shown in Figure 3 hinge section 31 swings around so as to interfere with the ground contact to a minimum degree below the pivot pin 32. When the bumper 30 is raised relative to the bumper contacting armor on vehicle 45 such bumper contacts the lower end of bumper 31.

Hinge section 31 is preferably so constructed that its division of weight, or added weight, 31a at its upper end is such as to over-balance the lower end, causes the bumper hinge section 31 to assume a horizontal position during normal operation, but not while being contacted by the pushing vehicle. This allows backing up without the hinge portion 31 digging into the ground unless the ground contact is higher than the pivot pin 32.

A hook 35 may be controlled from within the vehicle 40 by a control 36 so as to secure the hinge portion of the bumper in the vertical position where retention in that position is more important than the possible ground interference when backing up. This will assure the lower end of the hinge member 31 being in the lowest position, when held in that position by hook 35 for ready engagement with the pushing tank even when hinge 32 is raised above the bumper engaging armor on vehicle 45 as shown in Figure 4.

While the portions of the bumpers are shown and described it will be understood that the particular configuration is not a limiting factor and other forms of the device may be used to carry out the novel concept of a bumper design without departing from the spirit of this invention.

I claim:

1. In combination with a track-laying armored vehicle having disposed at the sides thereof a pair of tracks for traction, a rearwardly extending pushing bumper of the character described attached to the armor of said vehicle at the rear thereof between said pair of tracks and contactible in pushing relationship by frontal armor of a second track-laying armored vehicle without interference by tracks of either of said vehicles even when a substantial angle exists between the latter, said pushing bumper comprising an upper substantially vertically supported contact portion greater in vertical dimension than in width, a rear contact surface on said upper portion, spaced rigid support members attached to the top and bottom of said upper portion and to the armor at the rear of said vehicle between said pair of tracks, a hinged lower contact portion pivotally mounted adjacently forward of the bottom of said upper portion, said hinged lower portion normally assuming a substantially horizontal position in the absence of contact by a pushing vehicle, controllable hook means for operatively securing said hinged lower portion in substantially vertical position, and control means connected to said hook means and extending forwardly from the latter to within said vehicle for controlling operation of said hook means from within said vehicle.

2. The combination as set forth in claim 1, wherein said rear contact portion is crowned transversely.

BROOKS WALKER.

REFERENCES CITED

The following references are of record in the file of this patent:

UNITED STATES PATENTS

| Number | Name | Date |
|---|---|---|
| 1,392,001 | Elliot | Sept. 27, 1921 |
| 1,393,113 | Goss | Oct. 11, 1921 |
| 1,687,337 | Jaeger | Oct. 9, 1928 |
| 2,166,816 | Legat | July 18, 1939 |
| 2,207,918 | Goetz | July 16, 1940 |

FOREIGN PATENTS

| Number | Country | Date |
|---|---|---|
| 502,835 | France | Feb. 27, 1920 |